Sept. 20, 1966   W. I. CHAPMAN ETAL   3,273,904
REGENERATOR SEAL WITH DIAPHRAGM SUPPORT
Filed Oct. 7, 1963   4 Sheets-Sheet 3
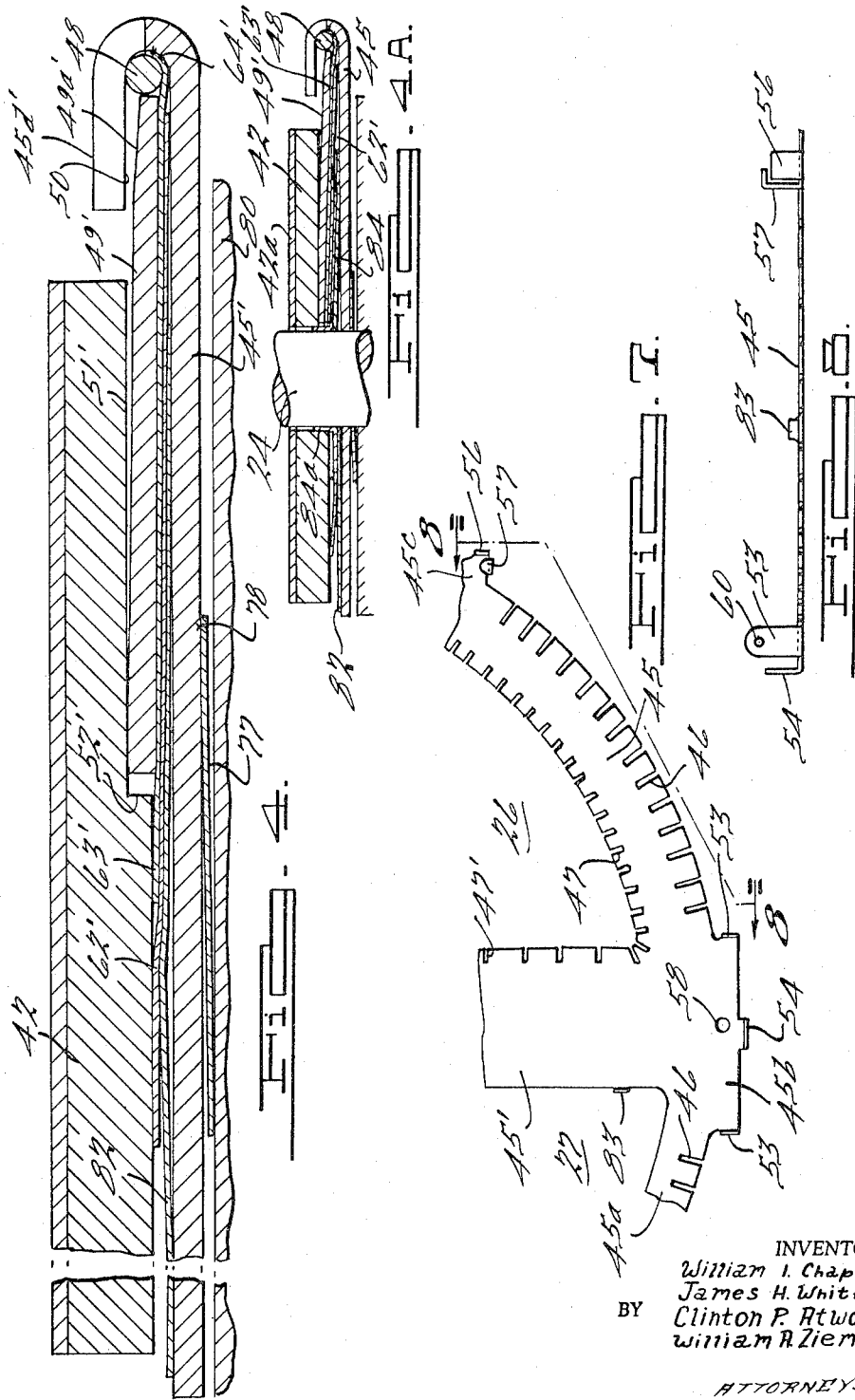
INVENTOR.
William I. Chapman
James H. Whitfield
BY Clinton P. Atwood
William A. Ziemke Jr.
ATTORNEYS

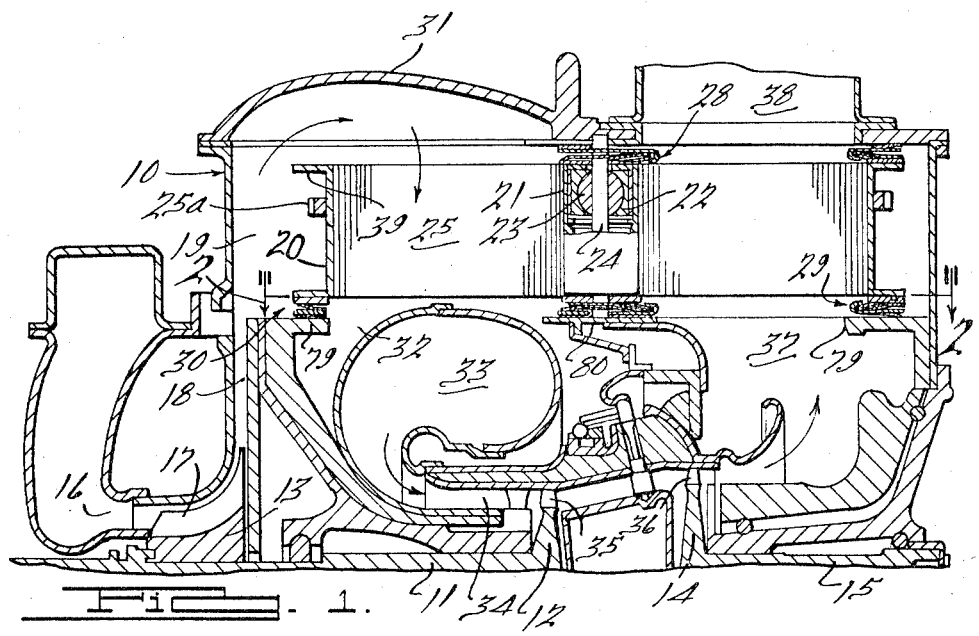

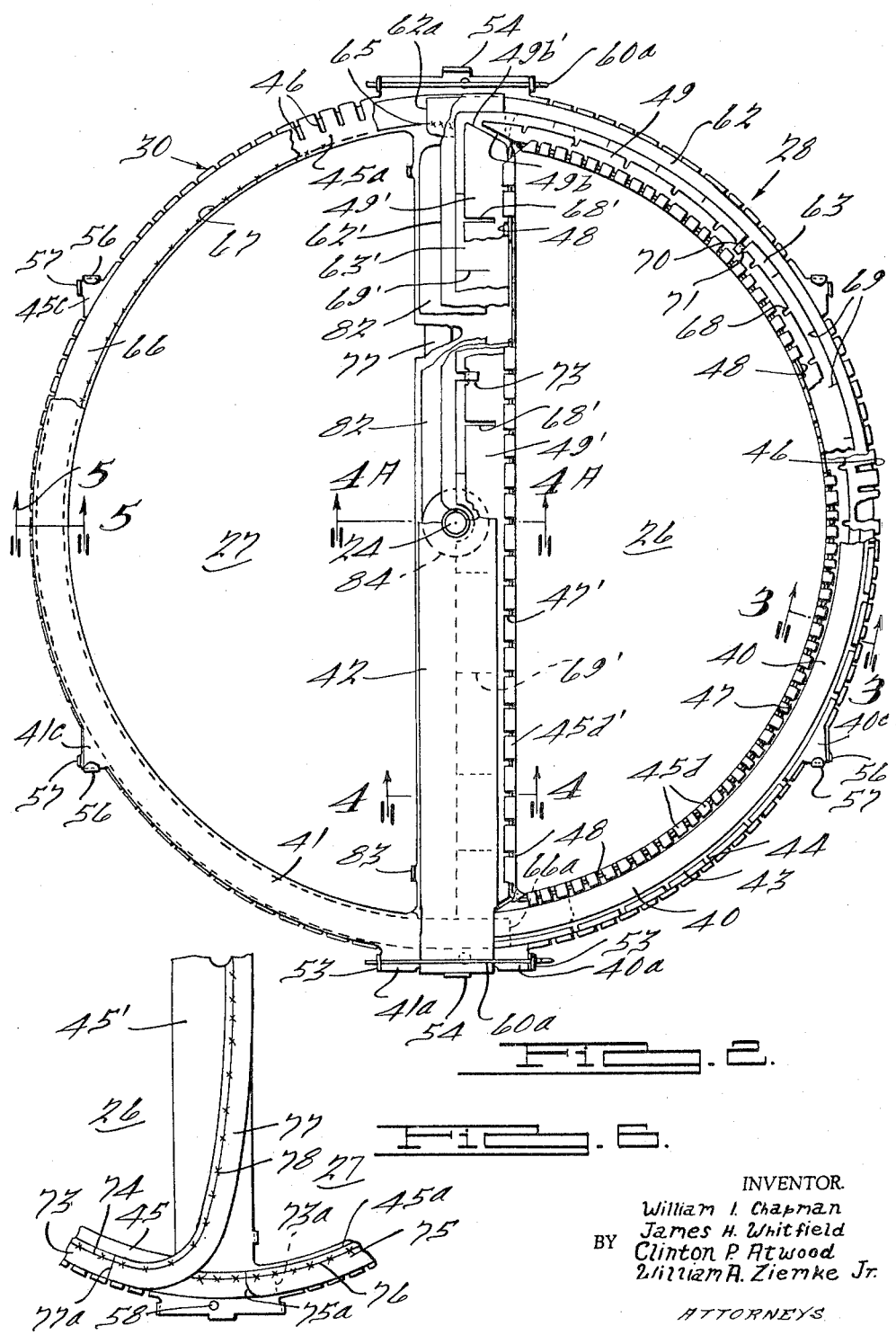

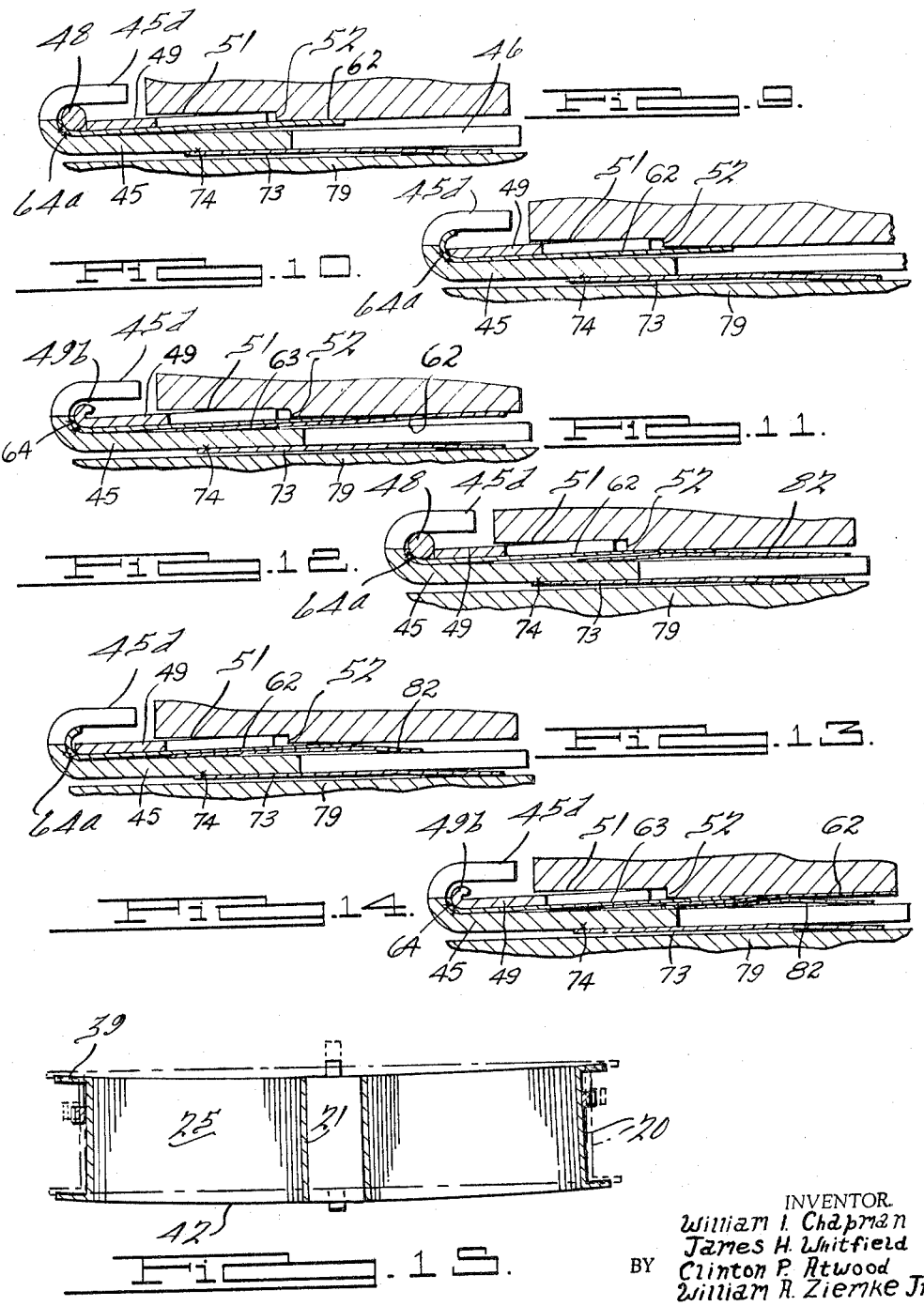

United States Patent Office 3,273,904
Patented Sept. 20, 1966

3,273,904
REGENERATOR SEAL WITH DIAPHRAGM SUPPORT
William I. Chapman, Birmingham, James H. Whitfield, Madison Heights, Clinton P. Atwood, Warren, and William A. Ziemke, Jr., Livonia, Mich., assignors to Chrysler Corporation, Highland Park, Mich., a corporation of Delaware
Filed Oct. 7, 1963, Ser. No. 314,466
20 Claims. (Cl. 277—96)

This invention relates to improvements in a seal for the rotating surface of a regenerator of a gas turbine engine.

In one type of gas turbine engine, a counter flow disk type regenerator rotatable about its axis and comprising a multitude of axial gas passages extending between parallel axially opposed plane end surfaces has one sector of its surface in the path of comparatively hot low-pressure gases to be heated thereby and a second sector of said surface in an oppositely directed path of comparatively cool high-pressure inlet gases to preheat the latter upon rotation of the regenerator to bring its heated sector into the path of the cooler inlet gases. In consequence of rotation of the regenerator and its alternate heating and cooling resulting from the counter flowing hot and cool gases flowing through the separate sectors, the regenerator is subject to continual warping such that the provision of an efficient seal between the hot and cool gases at the juncture of their paths with the regenerator end surfaces has not been possible heretofore. Reference is also made to copending application Serial No. 314,441, filed on the date of this application, for further details relating to the type of structure with which the present invention is concerned.

An important object of the present invention has therefore been to provide an efficient seal between the conduits for the inlet and exhaust gases at the end surfaces of a regenerator for a gas turbine engine which maintains sliding and sealing contact with the continually warping surfaces of the regenerator without subjecting the seal to undue pressure and excessive wearing of the sealing parts in consequence of frictional drag.

Another and more specific object has been to provide such a seal comprising an arcuate flexible rubbing seal having an innersealing surface in sliding and sealing contact with a plane axial end surface of the regenerator along the circumference of one of said sectors. An arcuate base plate confronts and is spaced from the outer side of the rubbing seal opposite the latter's innersealing surface to enable freedom of flexing or axial movement of the various parts of the rubbing seal as required to conform closely to the plane end surface of the regenerator regardless of the latter's warping or thermal distortion. An arcuate bridge structure coaxial with the rubbing seal and base plate has concave and convex edges pivotally engaging the base plate and the outer side of the rubbing seal respectively. The bridge structure extends radially from its concave edge to its convex edge in the direction toward the high pressure side of the seal. An arcuate flexible resilient diaphragm type seal engages the outer side of the rubbing seal in fluid tight contact along the length of the seal and extends radially from its engagement with the rubbing seal and along the bridge in the direction toward the low pressure side of the seal to the concave edge of the bridge so as to overlap the juncture between the convex edge of the bridge and the rubbing seal. An edge of the base plate is formed closely around the concave edge of the bridge and an interposed edge portion of the diaphragm type seal to clamp and effect a seal between the latter and the base plate. Thus the base plate and diaphragm seal comprise a bellows-type seal open to the high pressure gases which urge the diaphragm seal against the rubbing seal to enhance the sealing engagement therebetween and in turn urge the rubbing seal against the regenerator end surface to enhance the sealing contact therewith.

The seal is completed by a second flexible resilient diaphragm type seal interposed between the base plate and an arcuate coaxial baffle or platform carried by the engine housing to partition the high and low pressure gases from each other.

The bridge structure may comprise a bridge member of relatively rigid material loosely confined between the base plate and rubbing seal and pivotally supported thereby at its opposite edges to swing its concave edge toward and from the rubbing seal. The bridge thus provides a backing plate for the adjacent flexible diaphragm seal, so that the latter need not be sufficiently rigid to retain its form independently of the bridge when subject to the high pressure of the gas being sealed.

In consequence, freedom of movement between the rubbing seal and base plate is readily obtained and the resiliency of the diaphragm seal urging the same into sealing contact with the rubbing seal can be nominal in comparison with the sealing force resulting from the gas pressure urging the rubbing seal into sealing contact with the regenerator end surface. The resultant sealing force can thus be distributed over the inner sealing surface of the rubbing seal substantially as required to balance torsional forces and minimize localized wearing of the rubbing seal.

Another object is to provide a diaphragm type seal supported by a bridge structure as described wherein the sealing diaphragm is arcuate coaxially with the base plate and has a small conical angle such that the sealing diaphragm structure diverges from the base plate in the direction toward the high pressure gases to receive the same between itself and the base plate to effect the bellows-type seal. The diaphragm seal comprises a plane arcuate strip of thin flexible and slightly resilient material. The ends of the strip are pulled radially inwardly to a predetermined radius smaller than the radius of the initial plane strip to effect the conical shape and are secured to the base plate, as for example by being welded thereto.

The bridge is preferably formed from a plane arcuate strip comparatively unbendable in its radial dimension, but comparatively flexible in its circumferential direction. Warping of the bridge in consequence of the extreme temperature conditions resulting from operation of the seal is minimized by means of a plurality of circumferentially spaced slots extending in the bridge from its convex edge. In addition the slots facilitate the deformation of the bridge to conform to the conical shape of the diaphragm seal without appreciably reducing the support which the bridge offers the diaphragm seal.

Another object is to provide such a seal wherein the concave edge of the base plate, which may be a fixed part of the engine housing if desired, is slotted radially and deformed around the adjacent concave edge of the bridge to pivotally support the latter.

Another object is to provide such a seal wherein the outer surface of the rubbing seal is offset inwardly along an arcuate shoulder extending substantially the length of the seal and confronting the low pressure gases, whereby the diaphragm type seal overlaps the shoulder and extends along the bridge to the base plate. The bridge pivotally engages the inwardly offset portion of the rubbing seal adjacent the shoulder and extends angularly away from the rubbing seal to the base plate.

Thus the force of the high pressure gas applied against the diaphragm seal in a bellows-type action urging the same towards the rubbing seal and in turn urging the rubbing seal into sealing contact with the regenerator surface is concentrated against the rubbing seal adjacent the shoulder. In other words, the force of the gas pressure exerted on the diaphragm seal at the low pressure side of the shoulder is applied against the bridge and thus against the line of pivotal contact between the bridge and rubbing seal adjacent the shoulder. By suitably predetermining the location of the shoulder and the location of pivotal support for the bridge afforded by the base plate, both the magnitude and the distribution of the gas pressure force against the outer side of the rubbing seal can be predetermined.

Other objects are to provide such a seal which bounds a sector of a regenerator surface by means of the arcuate seal described and a similar but straight seal comprising a diametrical or radial boundary for the sector, and to provide an auxiliary spring means between the base plate and a diaphragm seal to urge the latter into sealing contact with the rubbing seal when the gas pressure differential across the seal is low.

Other objects of this invention will appear in the following description and appended claims, reference being had to the accompanying drawings forming a part of this specification wherein like reference characters designate corresponding parts in the several views.

FIGURE 1 is a fragmentary schematic view through a gas turbine engine embodying the present invention, taken longitudinally of the rotor axis.

FIGURE 2 is a plan view of a regenerator seal embodying the present invention taken in the direction of the arrows substantially along the line 2—2 of FIGURE 1, portions being broken away to illustrate details of construction.

FIGURE 3 is a fragmentary enlarged sectional view taken in the direction of the arrows substantially along the line 3—3 of FIGURE 2.

FIGURE 4 is a fragmentary enlarged sectional view taken in the direction of the arrows substantially along the line 4a—4a of FIGURE 2.

FIGURE 4a is a fragmentary enlarged sectional view taken in the direction of the arrows substantially along the line 4a—4a of FIGURE 2.

FIGURE 5 is a fragmentary enlarged sectional view taken in the direction of the arrows substantially along the line 5—5 of FIGURE 2.

FIGURE 6 is a fragmentary bottom view of the lower portion of the seal illustrated in FIGURE 2.

FIGURE 7 is a fragmentary enlarged elevational view of a portion of the base plate prior to its assembly with the bridge structure.

FIGURE 8 is a fragmentary elevational view taken in the direction of the arrows substantially along the line 8—8 of FIGURE 7.

FIGURES 9, 10 and 11 are views similar to FIGURE 3, showing different modifications of the invention.

FIGURES 12, 13 and 14 are views similar to FIGURE 4, showing different modifications of the invention.

FIGURE 15 is a schematic sectional view along the diameter of the regenerator parallel to the cross arm seal, illustrating one effect of regenerator warping.

It is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

Referring to the drawings, a particular embodiment of the present invention is illustrated by way of example in an automotive gas turbine engine comprising an engine housing 10 supporting a rotor shaft 11 having a first stage turbine rotor 12 secured to one end thereof and a rotary compressor 13 secured to its opposite end, FIGURE 1. The housing 10 also supports a second stage turbine rotor 14 secured to a shaft 15 to rotate the latter and supply motive power for the vehicle. Upon rotation of the rotor 12 as described below, the compressor 13 is operated to draw in combustion supporting air through compressor inlet 16, whereby the compressor blades 17 compress and discharge the air via a spiral diffuser 18 to an annular regenerator chamber 19.

The chamber 19 contains a disk type regenerator 20 having plane parallel upper and lower axial end faces and also having a hub 21 mounted for rotation about the axis of a central shaft 24 by means of a graphite bearing 22 formed to provide a spherical socket confining a ball 23 slidable axially along shaft 24. The latter is supported at its opposite ends within the housing 10. Accordingly, the regenerator 20 is mounted for moving freely along the axis of shaft 24 and in a universal pivotal movement about the center of ball 23. The universal mounting 22–23 is suitably supported within the hub 21.

The regenerator 20 comprises an annular core or matrix 25 of axial gas passages and is partitioned into two substantially semi-circular sectors 26 and 27, FIGURE 2, by means of superimposed semi-circular or D-shaped upper and lower seals 28 and 29 and a C-shaped seal 30. The seals 28 and 29 may be mirror images of each other and define the sector 26 for passage of high temperature and low pressure gases. The seal 30 cooperates with seal 29 to define the sector 27 for comparatively cool high pressure gases.

The incoming air within the regenerator chamber 19 will be at approximately the coolest temperature and highest pressure in the system and bathes the periphery of the regenerator 20 in the cool air to protect and facilitate operation of the regenerator drive mechanism including ring gear 25a secured to the periphery of regenerator 20.

The high pressure air from chamber 19 flows into the space under the dome 31 overlying sector 27, whereupon the air is conducted through the axial gas passages of sector 27 of regenerator matrix 25 into a collecting chamber 32. During passage of the cool air or gases through sector 27 of the regenerator matrix 25, these gases are heated by the matrix. The heated gases are then conducted from chamber 32 to a combustion chamber where fuel is added and burned. The hot combustion products or motive gases are then conducted to a spiral collecting chamber 33 and discharged into an annular gas passage 34 arranged to conduct the hot motive gases to the blades 35 and 36 of rotors 12 and 14 to drive the same. The hot exhaust gases are then discharged to chamber 37 below regenerator section 26 and thence upwardly through the axial gas passages of sector 26 of the regenerator matrix 25 to heat these passages. Thereafter the comparatively cool exhaust gases are exhausted into chamber 38 and then to atmosphere. During rotation of the regenerator 20, the hot gas passages of sector 26 are continually rotated to sector 27 to preheat the cool incoming combustion supporting air.

In the present instance each regenerator end face is provided with a coplanar annular flat rim 39 which extends radially from the matrix 25. The seals 29 and 30 comprise built-up structures including a three part rubbing seal adapted to lie flush against the lower rim 39 and coplanar regenerator end surface in fluid sealing engagement therewith. Inasmuch as the seal 28 may comprise a mirror image of seal 29, it will not be described in detail.

The rubbing seals include a low pressure and a high pressure C-shaped sealing member 40, 41 defining the sectors 26 and 27, respectively, and a diametrical or cross arm sealing member 42 spacing the members 40 and 41. These members may be approximately .20 inch thick and in one practical seal, their outer diameter is approximately 17 inches. The members 40 and 41 may be of thin graphite or other suitable sealing material capable of withstanding the extreme temperature conditions existing in the regenerator and are sufficiently flexible to conform closely to the regenerator upon its thermal distortion during operation.

The cross arm member 42, FIGURE 2, in the present instance is preferably formed of stainless steel because it is subjected to the highest effective temperature in the seal and would rapidly disintegrate if made of graphite.

The ends of the substantially semi-circular rubbing seal members 40 and 41 terminate in out-turned bosses 40a and 41a which snugly abut adjacent edges of the stainless steel cross arm rubbing seal member 42. Spaced approximately 60° apart and integral with the rubbing seals 40 and 41, respectively, are a pair of triangular bosses 40c and 41c, each triangular boss having one edge parallel to the cross arm rubbing seal 42 and having a second edge perpendicular thereto.

The sealing surface of the rubbing seals 40, 41 and 42 may be suitably grooved in order to predetermine the gas pressure distribution thereon to effect a desired unit loading and thereby to minimize uneven wearing. For example, the inner surface of seal 40 is provided with a semi-circular groove 43 communicating with the high pressure of chamber 19 via radial grooves 44. Thus the radial pressure gradient across the sealing surface or rubbing seal 40 will be considerably steeper and the total pressure force acting downwardly thereon will be somewhat greater than would otherwise be the case without the groove 43. In other words, the area of the rubbing seal 40 to the right of groove 43 in FIGURE 3 will be at the uniform high pressure of chamber 19. Leftward of the groove 43 the pressure applied against the outer surface of rubbing seal 40 will decrease from a maximum at groove 43 to a minimum equal to the low pressure within sector 26.

Coextensive with the rubbing seals 40, 41 and 42 is a comparatively thick and rigid stainless steel base plate comprising integral semi-circular portions 45 and 45a underlying the rubbing seals 40 and 41, respectively, and also including an integral diametrical cross arm portion 45' underlying the rubbing seal 42, FIGURE 7. The base plate portion 45, 45a and 45' preferably comprise a unitary stainless steel stamping approximately .04" thick, the peripheral portions 45 and 45a being provided with a plurality of circumferentially spaced slots 46 extending radially inward from their exterior or convex edges. Thus means are provided to adapt the base plate to the extreme radial temperature differential across its circumferential portions 45 and 45a and to reduce its thermally induced warping. Although the base plate is shown as a floating assembly between the rubbing seals and a fixed portion of the engine housing, the base plate itself may readily comprise a fixed portion of the engine housing, if desired.

The concave edge of the base plate portion 45 and the contiguous edge of the base plate portion 45' which define the sector 26 are slotted at 47 and 47' to minimize warping of the base plate and to facilitate folding of these slotted edges at 45d and 45d' tightly around a stainless steel wire 48. The latter extends completely around the sector opening 26 and comprises an anchor portion of a floating bridge structure between associated portions of the rubbing seal and base plate.

Cooperating with wire 48 to complete the bridge structure is an arcuate bridge member 49 extending along the base plate portion 45 around the circumferential portion of sector 26 and a cross arm or diametrical bridge member 49' extending along the diametric cross arm base plate portion 45'. The bridge members 49 and 49' have mitered juxtaposed ends 49b and 49b' to complete a two part D-shaped bridge confronting the outer sides of rubbing seals 40 and 42 and have one edge of each pivotally abutting wire 48 entirely around the sector 26, FIGURE 2.

The diameter of wire 48 is approximately two or three times the thickness of the bridge members 49 and 49' so that the slotted or grooved edges 45d and 45d' of the base plate wrapped around wire 48 will be spaced from the adjacent bridge portion 49 and 49' by a clearance 50. The latter is exaggerated in FIGURES 3 and 4 and in the usual instance, the wire 48 will be somewhat flattened by the force applied in bending the slotted base plate edge therearound. In order to provide adequate rigidity in the transverse dimension of the bridge portions 49 and 49', these are formed of stainless steel approximately .02" to .03" thick, whereas the diameter of wire 48 is approximately .05".

The outer surface of the rubbing seals 40 and 42 are recessed at 51 and 51', respectively, FIGURES 3 and 4, to provide shoulders 52 and 52' against which the exterior edges of the bridge members 49 and 49' are loosely seated for pivotal movement. Thus the bridge members 49 and 49' are freely floating between the rubbing seals 40 and 42 and associated base plate portions 45 and 45'. In operation, the gas pressure acting on the seal as described below will urge the base plate away from the rubbing seal and will urge the latter against the regenerator surface, thereby to eliminate the clearance 50 between the bridge and slotted edges 45d and 45d'. The upward gas pressure load on the bridge will thus be transferred to the edges 45d and 45d' and to the rubbing seals adjacent the shoulders 52 and 52'.

As illustrated in FIGURES 2 and 7, the opposite ends of the base plate cross arm 45' are provided with integral bosses 45b which underlie the bosses 40a and 41a of the arcuate rubbing seals 40 and 41 and the associated ends of the cross arm rubbing seal 42. In addition the circumferential base plate portions 45 and 45' are each provided with a pair of triangular bosses 45c corresponding in shape and underlying the rubbing seal bosses 40c and 41c. In order to retain the rubbing seals and base plate members together in assembled relationship, the bosses 45b are each provided with a pair of lateral tabs 53 and an end tab 54 which extend upwardly adjacent the rubbing seal bosses 40a and 41a and the end of cross arm rubbing seal member 42. The tabs 53 are provided with pin holes 60, FIGURE 8, through which extend a suitable retaining pin 60a loosely overlying the tabs 40a and 41a and the end of cross arm rubbing seal 42.

The bosses 45c are similarly provided with locating tabs 56 and 57. At least one of each pair is bent to loosely overlie the associated rubbing seal boss 40c or 41c. Each of the base plate bosses 45b is also provided with a locating dowel hole 58 adapted to receive a dowel pin projecting from the engine frame to prevent unintentional assembly of the seals 28, 30 in the housing 180° out of phase.

A gas-tight seal between the base plate portions 45, 45' and the associated rubbing seal members 40, 42 is accomplished by means of a diaphragm type seal including a two-part D-shaped diaphragm seal and a two-part D-shaped diaphragm support. The diaphragm seal includes an arcuate portion 62 and a diametric or cross arm portion 62' extending along the circumferential and diametric portions, respectively, of sector opening 26. The D-shaped diaphragm support comprises a circumferential portion 63 and a diametric or cross arm portion 63' extending along the circumferential and diametric portions, respectively, of sector opening 26.

The interior edges of the D-shaped diaphragm support 63, 63' overlie and are suitably secured to the associated base plate portions 45 and 45', FIGURES 2 and 3, as for example by an unbroken welding seam entirely around the sector opening 26 at the region of the wire 48. This seam includes the welding seam 64, FIGURE 3, along the arcuate base plate portion 45 and the welding seam 64' along the cross arm, base plate portion 45', FIGURES 3 and 4. In construction, the support 63, 63' is welded at 64 and 64', to the base plate prior to folding the edges 45d and 45d'. Thereafter these edges are folded around the wire 48 as illustrated. From the weld seams 64 and 64', the diaphragm support 63, 63' extends away from the sector opening 26 along the associated bridge portions 49 and 49' and overlaps the corresponding shoulders 52 and 52'.

The arcuate portion 62 of the diaphragm seal is cut from thin stainless steel sheet material to a larger radius than the final assembled radius shown and is then distorted to a conical shape by pulling its ends 62a into the smaller radius illustrated. The interior edge of the diaphragm seal 62 is wedged tightly between the base plate 45 and diaphragm support 63 and the opposite ends 62a are welded at 65 to the cross arm portion 45' of the base plate. In accordance with this construction, replacement of the diaphragm seal 62 is readily accomplished by prying loose the weld seams 65 and sliding the diaphragm 62 from between the base plate 45 and support 63.

The diametric or cross arm diaphragm seal 62' is similarly wedged between the portions 63' and 45' of the diaphragm support and base plate, respectively. It is not welded in position, so is readily replaceable. The diaphragms 62, 62' extend from the sector opening 26 so as to overlap the exterior edges of diaphragm support 63, 63' and engage the juxtaposed outer surfaces of the rubbing seal portions 40 and 42 to complete a fluid tight seal therewith entirely around the sector 26.

Around the circumferential portion of sector opening 27 extends a conical diaphragm seal 66 similar to the seal 62 having opposite ends 66a underlying the ends of seal 62, FIGURE 2. The interior edge of seal 66 is secured to the base plate portion 45a by an arcuate weld seam 67 to provide a fluid tight seam entirely around the circumference of the sector opening 27.

In order to enable the arcuate bridge portion 49 to conform to the conical shape of diaphragm seal 62, it is provided with a plurality of circumferentially spaced slots 68 extending radially therein from its edge adjacent shoulder 52. Similar but less closely spaced slots 68' are provided in the cross arm bridge portion 49' to enable the latter to conform more closely to the contour of rubbing seal 42 upon deformation thereof in accordance with thermal warping of regenerator 20. Inasmuch as the cross arm bridge member 49' is somewhat wider than is the arcuate portion 49, the bridge portion 49' is preferably somewhat thicker and is provided with a chamfered edge 49a' at its edge abutting wire 48, FIGURE 4.

The arcuate bridge portion 49 is also provided with several notches 70 to accommodate bent-over tabs 71 of the diaphragm support 63 which hold the bridge adjacent the wire 48 to facilitate handling of the seal prior to its assembly with the rubbing seal 40. Similarly the diaphragm support 63' provides several tabs 73 bent over bridge 49' to hold the latter adjacent the wire 48.

Similarly to the sealing diaphragm 62 around the circumference of sector 26 on the regenerator side of base plate 45, an arcuate conical stainless steel diaphragm seal 73 is provided on the opposite side of the base plate 45, FIGURE 6. The ends 73a of the diaphragm seal 73 are pulled radially inwardly to the desired diameter to effect the conical seal shape. The diaphragm 73 is then welded at 74 along its inner circumference to effect a fluid tight seam entirely around the circumference of sector 27 and also extending across the opposite ends of the cross arm portion 45' of the base plate.

Around the circumference of the sector 27 extends another conical seal 75 similar to the seal 73. The opposite ends 75a of the seal 75 overlap the ends 73. The interior edge of seal 75 is welded at 76 to the base plate 45a to effect a continuous seal around the circumference of the sector 27, the welded seams 74 and 76 comprising continuations of each other. Underlying the base plate cross arm 45' is a C-shaped diaphragm seal 77, which similarly to the seals 73 and 75 is pulled radially inwardly at its opposite ends to effect the desired conical shape. The opposite ends 77a of the seal 77 overlap end portions of the seal 73, the seal 77 being secured to the base plate portions 45' and 45 at a weld seam 78 which merges at its opposite ends with weld seam 74 and extends along the edge of the diaphragm seal 77 proximate the sector opening 26.

The diaphragm seals 73 and 75 overlie and engage an annular rigid platform 79 of the engine frame to effect a bellows type fluid seal therewith open to the high pressure air of chamber 19. The cross arm seal 77 overlies and engages a cross arm platform portion 80 comprising a coplanar diameter of the annular platform 79, thereby to effect a bellows type seal with the platform 80 open to the comparatively high pressure gases in sector 27. All of the seals 62, 62', 66, 73, 75 and 77 and supports 63, 63' are formed from thin flexible resilient stainless steel sheet stock, the seals being approximately .002" to .004" thick and the supports 63, 63' being slightly thicker to afford sufficient rigidity to prevent blow out of the seals 62, 62' at the regions of the shoulders 52, 52'.

By the construction described, the seals 62 and 62' cooperate with the associated base plate portions 45 and 45' to complete bellows-type seals opening to receive the high pressure gases from chamber 19 and sector 27, whereby the diaphragm seals 62 and 62' are urged against the outer surfaces of the rubbing seals 40 and 42 into fluid sealing engagement therewith. The bridge portions 49 and 49' freely pivotal at their interior and exterior edges with respect to the sector opening 26 enable the rubbing seals 40, 42 to move freely as required in order to conform to the regenerator in the sealing operation in accordance with its thermal distortion. Around the sector opening 27, the diaphragm seal 66 cooperates with the base plate portion 45a to complete a diaphragm seal open to the high pressure gases in chamber 19 to urge seal 66 snugly into sealing engagement with adjacent surface of the rubbing seal 41. In the same action, the gas pressures acting on diaphragm seals 62, 62' and 66 urge the rubbing seals 40, 41 and 42 into sealing engagement with the regenerator 20.

Similarly the diaphragm seals 73 and 75 cooperate with adjacent portions of the base plate opposite the rubbing seals to complete bellows-type seals open to the high pressure gases of chamber 19, so that diaphragm seals 73 and 75 are urged by fluid pressure into sealing engagement with platform 79. In a like manner seal 77 completes a bellows-type seal with base plate 45', the seal being open to the comparatively high pressure gases of chamber 27 to urge diaphragm seal 77 into sealing engagement with cross arm platform 80. In the above regard, the area at the inner surface of the base plate 45, 45' (i.e., at the upper side thereof in FIGURES 3 and 4) exposed to the high pressure gases is greater than the corresponding area at the opposite side of the base plate. In consequence the base plate and seals 73, 75, 77 will be held substantially flat against the platform 79, 80.

By virtue of the diaphragm supports 63 and 63', the gap between the bridge portions 49 and 49' and associated rubbing seals 40 and 42 is suitably bridged to prevent damage to the thinner diaphragm seals 62 and 62'. Accordingly the diaphragm supports 63 and 63' enable the use of a thinner diaphragm seal than would otherwise be possible, achieving a more efficient seal capable of operating at high pressure.

During operation of the regenerator 20, the comparatively cool gas flowing downwardly through sector 27 and being heated in its travel through the regenerator tends to maintain the upper surface of the regenerator cool with respect to the lower surface. Similarly the hot exhaust gases flowing upward through the sector 26 and being cooled in their travel through the regenerator tend to maintain the lower portion of the regenerator 20 hotter than the upper portion. In consequence the entire upper portions of the regenerator 20 operate at an appreciably lower temperature than the lower portions thereof in FIGURE 1, so that the regenerator tends to bow or dish as illustrated in FIGURE 15, wherein the bowing is exaggerated for the sake of illustration.

During operation, the high pressure gases acting on the seal urge the rubbing seals 40–42 closely against the regenerator surface so as to conform closely thereto during its thermal distortion. When the engine is not in operation and the regenerator 20 cools, the latter and the seals will tend to return to their undeformed shapes. In consequence of residual warping of the regenerator and seals, these members may no longer conform closely to each other, particularly at the region of the cross arm seal. Without some provision to the contrary, gaps amounting to several thousandths of an inch frequently exist between the rubbing seal 42 and the confronting plane face of the regenerator matrix. When an attempt is then made to start the engine, the cross arm portion of the seal will leak and permit an appreciable proportion of the inlet or combustion supporting air to flow directly from section 27 to sector 26 and bypass the combustion chamber and rotors 12, 14. This results because the seal is not subject to a sufficiently high pressure differential to hold the rubbing seal 42 tightly against the regenerator. A large starting motor will thus be required to compensate for the leakage across the cross arm seal.

In order to facilitate starting of the engine with a starting motor of minimum size, a supplementary leaf spring 82 is provided to extend lengthwise of the cross arm rubbing seal 42. The leaf spring 82 is bowed transversely of the cross arm seal 42, FIGURE 4, and is preferably arranged to underlie the sealing diaphragm 62' along a substantially line contact at the high pressure side of shoulder 52' so as to urge seal 62' into its sealing engagement with the rubbing seal 42 during starting of the engine when the gas pressure is low. The spring 82 also urges the flexible rubbing seal 42 into sealing engagement with the confronting face of the regenerator 20.

By virtue of the leaf spring 82, the cross arm rubbing seal 42 will be urged into sealing engagement with the regenerator to prevent gas flow directly from sector 27 to sector 26. The leaf spring 82 may be employed at the upper regenerator seal 28 and around the peripheral portions of the seals 29 and 30 but is less essential at these regions because the tendency of the regenerator matrix to pull away from the associated seals at these locations is less pronounced.

As indicated in FIGURE 4, the right edge of the leaf spring 82 fits snugly under the diaphragm seal 62'. Leftward shifting of the leaf spring 82 in FIGURE 4 is prevented by a pair of tabs 83 integral with the cross arm base plate 45' and bent upwardly from its left edge, FIGURES 2 and 7. As indicated in FIGURE 4a an annular sealing disk 84 of thin resilient material similar to the material of the diaphragm seal 62 is located around the shaft 24 between the leaf spring 82 and diaphragm seal 62'. An inner annular projection 84a of the disk 84 fits tightly around shaft 24 in sealing engagement therewith. The high pressure gases between the base plate 45 and disk 84 substantially flattens the latter against the diaphragm 62' to effect a seal to prevent leakage of gases through the necessarily large clearance hole in the seal 62' for shaft 24. The flexibility of the seal enabled by the bridge 49, 49' lends itself to numerous modifications, some of which are illustrated by way of example in FIGURES 9 through 14.

In FIGURE 9 the diaphragm support 63 is omitted and the diaphragm seal 62 is suitably confined between the wire 48 and base plate 45 to effect a bellows-type seal between the latter and diaphragm 62. The seal may be effected by welding the diaphragm 62 to the base plate 45 along a seam 64a comparable to the seam 64 or 64'. Thus structure, like the structure illustrated in FIGURE 3, may be employed either with the peripheral portions of the sectors 26 and 27 or the cross arm portion thereof. The elimination of diaphragm support 63, as in FIGURE 9, will simplify the sealing structure but will require a heavier and more inflexible sealing diaphragm 62.

In FIGURE 10 the wire 48 is eliminated and the seal between the diaphragm 62 and base plate 45 is accomplished by the welding seam 64a.

In FIGURE 11, the wire 48 is eliminated and the low pressure edge of the bridge 49 is curved in the loop 49b to interfit pivotally within the edge loop 45d of the base plate 45.

The structures of FIGURES 9, 10 and 11 may be employed either at the peripheral portions of the sectors to be sealed or at the base plate portions thereof and may be employed either with or without a leaf spring 82 to enhance or to supplant the resiliency of the sealing diaphragm 62 as illustrated in FIGURES 12, 13 and 14. In other respects, the seals of FIGURES 9–14 are the same as described above with respect to the preceding figures, especially FIGURES 3 and 4.

We claim:

1. In a seal for the regenerator of a gas turbine engine, rubbing means having an inner sealing surface adapted to engage a mating surface of said regenerator to define a seal between high and low pressure gases, base means confronting an outer side of said rubbing means opposite said sealing surface and being movable toward and from the same, bridge means engaging said outer side of said rubbing means, resilient sealing means including a flexible diaphragm and a flexible diaphragm support, said diaphragm support having one edge confined between portions of said bridge means and base means to effect a fluid seal therebetween and extending from said one edge to overlap the engagement between said bridge means and rubbing means and engage the latter's outer side, said diaphragm being wedged between said support and base means adjacent said one edge and extending therefrom in juxtaposition with said support and beyond the latter in juxtaposition with said outer side of said rubbing means to engage the latter in fluid sealing relationship, said base means and resilient sealing means comprising a bellows type seal open to said high pressure gases to enhance said fluid sealing relationship.

2. In the combination according to claim 1, said diaphragm being welded to said base means to effect a fluid tight seam extending longitudinally of said seal.

3. In the combination according to claim 1, a portion of the outer side of the said rubbing means being offset inwardly to provide a shoulder extending longitudinally of said seal and confronting said low pressure gases, said bridge means pivotally engaging said offset portion at said shoulder.

4. In the combination according to claim 3, said diaphragm being welded to said base means to effect a fluid tight seam extending longitudinally of said seal.

5. In the combination according to claim 1, the portion of said support overlapping said engagement between said bridge and rubbing means having a plurality of edgewise slots therein spaced along said seal and extending transversely thereof to the edge of said support opposite said one edge thereof.

6. In a seal for the regenerator of a gas turbine engine, rubbing means having an arcuate inner sealing surface adapted to engage a mating surface of said regenerator to define an arcuate seal between high and low pressure gases, base means confronting an outer side of said rubbing means opposite said sealing surface and being movable toward and from the same, bridge means extending arcuately along said seal, said bridge means having a convex edge pivotally engaging said outer side of said rubbing means and extending outwardly from said rubbing means and in the direction away from the high pressure side of said seal to a concave edge adapted to swing inwardly and outwardly with respect to said rubbing means upon pivoting of said bridge means, said bridge means also having a plurality of slots therein spaced along said seal and extending in said direction from its convex edge to facilitate thermally induced conical deformation of said bridge during said pivoting, resilient sealing means including a flexible diaphragm and a flexible diaphragm support, said support having a concave edge confined between said base means and said bridge means adjacent the latter's concave edge to effect a fluid seal between said support and base means, said support extending from said concave edge in juxtaposition with bridge means to be supported thereby and to overlap the latter's convex edge and engage said outer side of said rubbing means, the portion of said support engaging said rubbing means having a plurality of edgewise opening slots therein to facilitate thermally induced conical deformation of said support upon said pivoting of said bridge means, said diaphragm being wedged between said support and base means adjacent said concave edges and extending in juxtaposition with said support and beyond the latter to engage said rubbing means in fluid sealing relationship, said base means and resilient sealing means comprising a bellows type seal open to said high pressure gases to enhance said fluid sealing relationship.

7. In a seal for the regenerator of a gas turbine engine, rubbing means having an inner sealing surface adapted to engage a mating surface of said regenerator to define a seal between high and low pressure gases, base means confronting an outer side of said rubbing means opposite said sealing surface and being movable toward and from the same, a flexible sealing diaphragm interposed between said base means and rubbing means and engaging the latter in fluid sealing relationship, a flexible diaphragm support interposed between said diaphragm and rubbing means and terminating in an edge overlapped by said diaphragm, said support extending to a second edge in the direction toward the low pressure gases and along said diaphragm to support the the same, said diaphragm extending from said rubbing means in said direction to said base means and being wedged between the latter and support to effect a fluid seal with said base means, said base means and diaphragm comprising a bellows type seal open to said high pressure gases, and bridge means having one edge pivotally engaging said rubbing means at a location overlapped by said diaphragm support, said bridge means extending to a second edge in said direction along said support to support the same, said base means being formed loosely around said second edge of said bridge means to pivotally interengage the latter.

8. In the combination according to claim 7, said second edge of said diaphragm support being welded to said base means adjacent the portion thereof formed around said second edge of said bridge means.

9. In the combination according to claim 8, said diaphragm support having a plurality of slots therein at said second edge thereof, said slots extending transversely of said seal and being spaced longitudinally thereof.

10. In a seal for the regenerator of a gas turbine engine, arcuate rubbing means having an inner sealing surface adapted to engage a mating surface of said regenerator to define an arcuate seal between high and low pressure gases, an arcuate base plate confronting an outer side of said rubbing means opposite said sealing surface and having concave and convex edges, arcuate bridge means having a convex edge engaging said outer side of said rubbing means, resilient sealing means including a flexible conical diaphragm and a flexible arcuate diaphragm support, said support having a concave edge confined between portions of said bridge means and base plate adjacent the latter's concave edge to effect a fluid seal therebetween and extending from said concave edge to overlap the engagement between said bridge means and rubbing means and engage the latter's outer side, said diaphragm comprising sheet stock formed to a predetermined arcuate diameter and having opposite ends pulled radially inwardly to a smaller diameter and welded to said base plate to effect the conical shape of said sealing means, the concave edge of said sealing diaphragm being wedged between said support and base plate adjacent the latter's concave edge and extending therefrom in juxtaposition with said support to overlap the latter's convex edge and engage said rubbing means in fluid sealing relationship, said base plate and resilient sealing means comprising a bellows type seal open to said high pressure gases to enhance said fluid sealing relationship.

11. In a seal for the regenerator of a gas turbine engine, arcuate rubbing means having an inner sealing surface adapted to engage a mating surface of said regenerator to define an arcuate seal between high and low pressure gases, a portion of the outer side of said rubbing means opposite said sealing surface being offset inwardly to provide a shoulder extending longitudinally of said seal and confronting the low pressure side thereof, an arcuate base plate confronting an outer side of said rubbing means opposite said sealing surface and having concave and convex edges, arcuate bridge means having a convex edge engaging said outer side of said rubbing means, resilient sealing means including a flexible conical diaphragm and a flexible arcuate diaphragm support, said support having a concave edge confined between portions of said bridge means and base plate adjacent the latter's concave edge to effect a fluid seal therebetween and extending from said concave edge to overlap the engagement between said bridge means and rubbing means and engage the latter's outer side, said diaphragm comprising sheet stock formed to a predetermined arcuate diameter and having opposite ends pulled radially inwardly to a smaller diameter and welded to said base plate to effect the conical shape of said sealing means, the concave edge of said sealing diaphragm being wedged between said support and base plate adjacent the latter's concave edge and extending therefrom in juxtaposition with said support to overlap the latter's convex edge and engage said rubbing means in fluid sealing relationship, said base plate and resilient sealing means comprising a bellows type seal open to said high pressure gases to enhance said fluid sealing relationship.

12. In a seal for the regenerator of a gas turbine engine, arcuate rubbing means having an inner sealing surface adapted to engage a mating surface of said regenerator to define an arcuate seal between high and low pressure gases, an arcuate base plate confronting an outer side of said rubbing means opposite said sealing surface and having concave and convex edges, arcuate bridge means having a convex edge engaging said outer side of said rubbing means, resilient sealing means including a flexible conical diaphragm and a flexible arcuate diaphragm support, said support having a concave edge confined between portions of said bridge means and base plate and welded to the latter adjacent the latter's concave edge to effect a fluid seal therewith extending longitudinally of said seal, said support extending from said concave edge to overlap the engagement between said bridge means and rubbing means and engage the latter's outer side, said diaphragm comprising sheet stock formed to a predetermined arcuate diameter and having opposite ends pulled radially inwardly to a smaller diameter and welded to said base plate to effect the conical shape of said sealing means, the concave edge of said sealing diaphragm being wedged between said support and base plate adjacent the latter's concave edge and extending therefrom in juxtaposition with said support to overlap the latter's convex edge and engage said rubbing means in fluid sealing relationship, said base plate and resilient sealing means comprising a bellows type seal open to said high pressure gases to enhance said fluid sealing relationship.

13. In the combination according to claim 12, the convex of said diaphragm support having a plurality of slots extending therein toward its concave edge and spaced longitudinally of said seal, said slots overlapping the convex edge of said bridge means.

14. In a seal for the regenerator of a gas turbine engine, arcuate rubbing means having an inner sealing surface adapted to engage a mating surface of said regenerator to define an arcuate seal between high and low pressure gases, an arcuate base plate confronting an outer side of said rubbing means opposite said sealing surface and having concave and convex edges, arcuate bridge means having a convex edge engaging said outer side of said rubbing means, resilient sealing means including a flexible conical diaphragm and a flexible arcuate diaphragm support, said support having a concave edge confined between portions of said bridge means and base plate adjacent the latter's concave edge to effect a fluid seal therebetween and extending from said concave edge to overlap the engagement between said bridge means and rubbing means and engage the latter's outer side along the convex edge of said support, the convex edge of said support having a plurality of slots extending therein toward said concave edge and spaced longitudinally of said seal, said diaphragm comprising sheet stock formed to a predetermined arcuate diameter and having opposite ends pulled radially inwardly to a smaller diameter and welded to said base plate to effect the conical shape of said sealing means, the concave edge of said sealing diaphragm being wedged between said support and base plate adjacent the latter's concave edge and extending therefrom in juxtaposition with said support to overlap the latter's convex edge and engage said rubbing means in fluid sealing relationship, said base plate and resilient sealing means comprising a bellows type seal open to said high pressure gases to enhance said fluid sealing relationship.

15. In a seal for the regenerator of a gas turbine engine, rubbing means having an inner sealing surface adapted to engage a mating surface of said regenerator to define a seal between high and low pressure gases, a portion of the outer side of said rubbing means opposite said sealing surface being offset inwardly to provide a shoulder extending longitudinally of said seal and confronting the low pressure side thereof, a base plate confronting the outer side of said rubbing means, a wire extending longitudinally of said seal, an edge portion of said base plate being formed around said wire to grip the latter, a bridge member of rigid material extending from said wire to said rubbing means and spacing the same, said bridge member being freely supported for pivotal movement at one end by said rubbing means and at its opposite end by said wire and base plate, resilient sealing means including a flexible diaphragm and a flexible diaphragm support, said diaphragm support having one edge confined between portions of said wire and base plate to effect a fluid seal therebetween and extending from said one edge to an opposite edge to overlap the engagement between said bridge member and rubbing means and engage the latter's outer side, said opposite edge having a plurality of slots extending therein toward said one edge and spaced longitudinally of said seal, said diaphragm being wedged between said support and base plate adjacent said one edge and extending therefrom in juxtaposition with said support and beyond the latter to engage the outer side of said rubbing means in fluid sealing relationship, said base plate and resilient sealing means comprising a bellows type seal open to said high pressure gases to enhance said fluid sealing relationship.

16. In a seal for the regenerator of a gas turbine engine, rubbing means having an inner sealing surface adapted to engage a mating surface of said regenerator to define a seal between high and low pressure gases, a portion of the outer side of said rubbing means opposite said sealing surface being offset inwardly to provide a shoulder extending longitudinally of said seal and confronting the low pressure side thereof, a base plate confronting the outer side of said rubbing means, a wire extending longitudinally of said seal, an edge portion of said base plate being formed around said wire to grip the latter and having a plurality of slots therein extending transversely of said wire and spaced longitudinally thereof, a bridge member of rigid material extending from said wire to said rubbing means and spacing the same, said bridge member being freely supported for pivotal movement at one end by said rubbing means and at its opposite end by said wire and base plate, resilient sealing means including a flexible diaphragm and a flexible diaphragm support, said diaphragm support having one edge welded to said base plate to effect a fluid seal extending longitudinally of said seal, said support extending from said one edge to an opposite edge to overlap the engagement between said bridge member and rubbing means and engage the latter's outer side, said diaphragm being wedged between said support and said base plate adjacent said one edge and extending therefrom in juxtaposition with said support and beyond the latter to engage the outer side of said rubbing means in fluid sealing relationship, said base plate and resilient sealing means comprising a bellows type seal open to said high pressure gases to enhance said fluid sealing relationship.

17. In the combination according to claim 16; said seal being arcuate and said rubbing means, shoulder, base plate, wire and bridge member extending arcuately along said sealing diaphragm being conical and having a concave edge adjacent said wire and having a convex edge overlapping said opposite edge of said support and engaging the outer side of said rubbing means to effect said fluid sealing relationship; said diaphragm comprising sheet stock formed to a predetermined arcuate diameter and having opposite ends pulled radially inwardly to a smaller diameter and welded to said base plate to effect the conical shape of said sealing diaphragm.

18. In the combination according to claim 17, said one edge and opposite edge of said diaphragm support being concave and convex respectively, said convex edge of said support having a plurality of circumferentially spaced slots extending therein toward said concave edge.

19. In a seal for the regenerator of a gas turbine engine, rubbing means having an inner sealing surface adapted to engage a mating surface of said regenerator to define a seal between high and low pressure gases, a base plate confronting an outer side of said rubbing means opposite said sealing surface, a wire extending longitudinally of said seal, an edge portion of said base plate being formed around said wire to grip the latter, a bridge member of rigid material extending from said wire to said rubbing means and spacing the same, said bridge member being freely supported for pivotal movement at one end by said rubbing means and at its opposite end by said wire and base plate, resilient sealing means including a flexible diaphragm and a flexible diaphragm support, said diaphragm support having one edge welded to said base plate to effect a fluid seal therewith extending longitudinally of said seal, said support extending from said one edge to an opposite edge to overlap the engagement between said bridge member and rubbing means and engage the latter's outer side, said opposite edge having a plurality of slots extending therein toward said one edge and spaced longitudinally of said seal, said diaphragm being wedged between said support and base plate adjacent said one edge and extending therefrom in juxtaposition with said support and beyond the latter to engage the outer side of said rubbing means in fluid sealing relationship, said base plate and resilient sealing means comprising a bellows type seal open to said high pressure gases to enhance said fluid sealing relationship.

20. In a seal for the regenerator of a gas turbine engine, rubbing means having an inner sealing surface adapted to engage a mating surface of said regenerator to define a seal between high and low pressure gases, base mens confronting an outer side of said rubbing means opposite said sealing surface and being movable toward and from the same, bridge means engaging said outer side of said rubbing means, resilient sealing means including a flexible diaphragm and a flexible diaphragm support, said diaphragm support having one edge confined between portions of said bridge means and base means and welded to the latter to effect a fluid seal therewith extending longitudinally of said seal, said support extending to a second edge from said one edge to overlap the engagement between said bridge means and rubbing means and engage the latter's outer side, the second edge of said support having a plurality of slots extending therein toward said one edge and spaced longitudinally of said seal, said diaphragm being wedged between said support and base means adjacent said one edge and extending therefrom in juxtaposition with said support and beyond the latter in juxtaposition with said outer side of said rubbing means to engage the latter in fluid sealing relationship, said base means and resilient sealing means comprisin ga bellows type seal open to said high pressure gases to enhance said fluid sealing relationship.

References Cited by the Examiner
UNITED STATES PATENTS

| | | | |
|---|---|---|---|
| 2,469,065 | 5/1949 | Coss | 277—81 X |
| 2,880,972 | 4/1959 | Williams | 165—9 |
| 3,185,208 | 5/1965 | Chute | 165—9 |
| 3,204,969 | 9/1965 | Williams | 277—88 X |

LAVERNE D. GEIGER, *Primary Examiner.*

J. MEDNICK, *Assistant Examiner.*

UNITED STATES PATENT OFFICE
CERTIFICATE OF CORRECTION

Patent No. 3,273,904 September 20, 1966

William I. Chapman et al.

It is hereby certified that error appears in the above numbered patent requiring correction and that the said Letters Patent should read as corrected below.

Column 3, line 38, for "4a-4a" read -- 4-4 --; column 9, line 71, for "Thus" read -- This --; column 11, line 36, strike out "the", first occurrence; column 12, line 73, after "convex" insert -- edge --; column 14, line 24, after "along" insert -- said seal; --; line 71, for "mens" read -- means --; column 16, line 2, for "comprisin ga" read -- comprising a --.

Signed and sealed this 1st day of October 1968.

(SEAL)
Attest:

Edward M. Fletcher, Jr.
Attesting Officer

EDWARD J. BRENNER
Commissioner of Patents